(12) United States Patent
Bouchy et al.

(10) Patent No.: US 7,718,053 B2
(45) Date of Patent: *May 18, 2010

(54) SELECTIVE HYDROGENATION PROCESS EMPLOYING A CATALYST HAVING A CONTROLLED POROSITY

(75) Inventors: Christophe Bouchy, Lyons (FR);
Florent Picard, Communay (FR);
Nathalie Marchal, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 365 days.

This patent is subject to a terminal disclaimer.

(21) Appl. No.: 11/642,976

(22) Filed: Dec. 21, 2006

(65) Prior Publication Data
US 2007/0170098 A1      Jul. 26, 2007

(30) Foreign Application Priority Data
Dec. 22, 2005    (FR) .................................. 05 13172

(51) Int. Cl.
*C07C 7/163*    (2006.01)

(52) U.S. Cl. ........................ 208/143; 208/108; 208/112; 208/144; 208/145; 208/208 R; 208/209

(58) Field of Classification Search ................. 208/108, 208/112, 143–145
See application file for complete search history.

(56) References Cited

U.S. PATENT DOCUMENTS

| | | |
|---|---|---|
| 3,472,763 A | 10/1969 | Cosyns et al. |
| 2004/0007503 A1 * | 1/2004 | Uzio et al. .............. 208/216 R |
| 2004/0007504 A1 * | 1/2004 | Uzio et al. .............. 208/216 R |
| 2004/0226863 A1 | 11/2004 | Uzio et al. |
| 2007/0173674 A1 | 7/2007 | Bouchy et al. |
| 2007/0187297 A1 | 8/2007 | Bouchy et al. |

FOREIGN PATENT DOCUMENTS

| | | |
|---|---|---|
| GB | 1 379 202 A | 1/1975 |
| GB | 1 415 417 A | 11/1975 |
| WO | WO 01/21734 A1 * | 3/2001 |

OTHER PUBLICATIONS

Sun M et al, Theoretical Investigations of the Structures and Prosperities of Molybdenum-based Sulfide Catalysts, Applied Catalysis, (Jun. 10, 2004), pp. 131-143, vol. 263, No. 2, Amsterdam, NL.
Toba M. et al., Selective Hydrodesulfurization of FCC Gasoline Over CoMo/A12O3 Sulfide Catalyst Catalysis Today, (Jun. 15, 2005), pp. 64-69, vol. 104, No. 1.

* cited by examiner

*Primary Examiner*—Robert J Hill, Jr.
*Assistant Examiner*—Brian McCaig
(74) *Attorney, Agent, or Firm*—Millen, White, Zelano & Branigan, P.C.

(57) ABSTRACT

A process for jointly carrying out selective hydrogenation of polyunsaturated compounds into monounsaturated compounds contained in gasolines, and for transforming light sulphur-containing compounds into heavier compounds by reaction with unsaturated compounds employing a supported catalyst, comprising at least one metal from group VIB and at least one non-noble metal from group VIII used in the sulphurized form deposited on a support and having a controlled porosity, and comprising bringing the feed into contact with the catalyst at a temperature in the range of 80° C. to 220° C. at a liquid hourly space velocity in the range of 1 $h^{-1}$ to 10 $h^{-1}$ and at a pressure in the range of 0.5 to 5 MPa.

24 Claims, 1 Drawing Sheet

Key: MAV résiduelle (mg/g) = Residual MAV (mg/g)
Temps (h) = Time (h)

SELECTIVE HYDROGENATION PROCESS EMPLOYING A CATALYST HAVING A CONTROLLED POROSITY

FIELD OF THE INVENTION

The production of gasoline satisfying new environmental specifications requires a large reduction in their sulphur content to values which generally do not exceed 50 ppm and are preferably less than 10 ppm.

It is also known that conversion gasolines, more particularly those from catalytic cracking, which may represent 30% to 50% of the gasoline pool, have high mono-olefin and sulphur contents.

Thus, almost 90% of the sulphur present in the gasoline can be attributed to gasolines from catalytic cracking processes, hereinafter termed FCC gasoline (fluid catalytic cracking). FCC gasolines thus constitute the preferred feed for the process of the present invention.

More generally, the process of the invention is applicable to any gasoline cut containing a certain proportion of diolefins and which may also contain several lighter compounds from C3 and C4 cuts.

Gasolines from cracking units are generally rich in mono-olefins and sulphur, but also in diolefins in an amount, for gasolines from catalytic cracking, of 1% by weight to 5% by weight. Diolefins are unstable compounds which polymerize easily and must generally be eliminated before processing those gasolines, such as by using hydrodesulphurization treatments intended to satisfy specifications regarding the amount of sulphur in gasolines. However, that hydrogenation must be selectively applied to diolefins to limit the hydrogenation of mono-olefins and to limit the consumption of hydrogen and the octane loss of the gasoline. Further, as described in EP-A1-1 077 247, it is advantageous to transform saturated light sulphur-containing compounds, which are sulphur-containing compounds with a boiling point lower than that of thiophene, such as methanethiol, ethanethiol or dimethylsulphide, into heavier compounds before the desulphurization step, as that can produce a desulphurized gasoline fraction mainly composed of mono-olefins containing 5 carbon atoms without a loss of octane by simple distillation. The sulfur content in the feedstock after selective hydrogenation and the transformation of light sulphur-containing compounds into heavier compounds is not modified, only the nature of the sulfur is modified due to the transformation of light sulphur-containing compounds into heavier compounds.

Further, the diene compounds present in the feed to be treated are unstable and tend to form gums by polymerizing. Such gum formation causes progressive deactivation of the selective hydrogenation catalyst or progressive plugging of the reactor. For industrial application, it is thus important to use catalysts which limit the formation of polymers, i.e. catalysts having a low acidity or wherein the porosity is optimized to facilitate continuous extraction of polymers or gum precursors by the hydrocarbons of the feed, to ensure a maximum life cycle for the catalyst.

The present invention pertains to the use of a novel catalyst in a process that can jointly carry out hydrogenation of polyunsaturated compounds, and more particularly of diolefins, and transform light sulphur-containing compounds, more particularly mercaptans, into heavier compounds.

One advantage of the invention is to facilitate sulphur elimination by transforming mercaptans into heavier compounds to separate them more easily and thus eliminate them in a subsequent hydrodesulphurization step.

Another advantage of the invention is to produce a gasoline having a high octane index.

A further advantage of the invention is to eliminate diolefin compounds and thus to stabilize the feed before its passage into the hydrodesulphurization unit.

A third advantage of the invention resides in the fact that the catalyst formulation is adjusted to ensure better stability of the catalyst as regards polymer formation, good selectivity as regards diolefin hydrogenation and good activity in the conversion of mercaptans and other light sulphur-containing compounds.

PRIOR ART

The literature describes catalytic formulations or processes which can either selectively hydrogenate diolefins to mono-olefins or transform mercaptans by transforming them into heavier compounds, or carry out these two types of reaction in one or two steps.

The use of catalysts containing at least one noble metal is known. Many patents propose catalysts for selective hydrogenation which contain palladium. Palladium is known for its hydrogenating activity and is widely used in selective hydrogenation processes. However, palladium is sensitive to poisons and in particular to the presence of sulphur. The present invention differs from those catalysts in that the catalyst of the invention contains no palladium and, more broadly, contains no noble metals.

European patent application EP-A1-0 685 552 proposes a process for hydrogenating diolefins and reducing the mercaptans content of a catalytically cracked gasoline based on a catalyst containing between 0. 1% and 1% by weight of palladium.

European patent application EP-A1-0 623 387 proposes a catalyst comprising at least one group VIII metal preferably selected from platinum, palladium and nickel and at least one additional metal M preferably selected from the group formed by germanium, tin, lead, titanium, iron, molybdenum, tungsten and rhenium. The catalyst is characterized in that the group VIII metal is activated by reduction in the reactor before introducing the metal M. The catalyst of the present invention differs from that patent in that it does not undergo reduction during the preparation phase.

The following patents and patent applications propose solutions for selectively hydrogenating diolefins; reactions which may affect sulphur-containing compounds, if they are present, are not mentioned.

U.S. Pat. No. 6,469,223 concerns a process for selective hydrogenation of diolefins on a catalyst containing nickel and molybdenum on an alumina-based support. The process is characterized in that the nickel and molybdenum metals are used in the form of oxides. The present invention differs from that prior art in that the metals are used in the form of metal sulphides rather than oxides.

U.S. Pat. No. 3,472,763 proposes a process for selective hydrogenation involving a nickel-based catalyst supported on alumina. The catalyst may also, and preferably, contain between 1% and 10% of molybdenum. That catalyst is also characterized by a pore distribution such that the total pore volume is more than 0.4 $cm^3/g$, with 40% to 80% of that volume corresponding to pores with a diameter of more than 0.05 and wherein pores with a diameter in the range 0.05 to 1 micron represent more than 20% of the pore volume. That patent also teaches that it is preferable to reduce the metals before their partial sulphurization. The catalyst of the present invention differs from that prior art primarily in the amount of molybdenum, which is over 10% by weight, and by the sulphurization step which is carried out on the metals in the oxide state.

The following patents and patent applications propose solutions to transform mercaptans into heavier compounds by thioetherification reactions, and optionally to selectively hydrogenate diolefins.

U.S. Pat. No. 5,807,477 proposes a process which, in a first step, can transform mercaptans into sulphides by addition to diolefins on a catalyst comprising a group VIII metal, preferably nickel, in the oxide form, then in a second step, selectively hydrogenating the diolefins in a reactive distillation column in the presence of hydrogen. The present invention differs from that patent in that the selective hydrogenation and steps for transforming the sulphur-containing compounds into heavier compounds are carried out jointly on the same catalyst used in the sulphurized form.

U.S. Pat. No. 5,851,383 describes a process for selective hydrogenation and thioetherification of C3-C5 cuts characterized by a distillation apparatus comprising two fractionation zones which can separately recover the light compounds and the thioethers. The catalysts described are either catalysts based on a group VIII metal or resins containing a metal. A catalyst containing between 15% and 35% of nickel is preferred. The catalyst of the present invention differs from the catalyst in that patent as the hydrogenation metal is a group VIB metal and the nickel content is less than 15% by weight.

In the light of the solutions described in the literature, the present invention proposes a process which can jointly carry out hydrogenation of polyunsaturated compounds, more particularly diolefins, and transform light sulphur-containing compounds, more particularly mercaptans, into heavier compounds using a catalyst with a controlled porosity. Said catalyst has improved stability and activity compared with prior art catalysts.

BRIEF DESCRIPTION OF THE INVENTION

The present invention describes a process for selective hydrogenation of polyunsaturated compounds, more particularly diolefins, which can jointly transform saturated light sulphur-containing compounds, more particularly mercaptans, into heavier compounds, said process employing a catalyst containing at least one metal from group VIB and at least one non-noble metal from group VIII deposited on a porous support, in which:

the amount, by weight of oxide, of the group VIB element is strictly greater than 12% by weight;
the amount, by weight of oxide, of the group VIII element is less than 15% by weight;
the degree of sulphurization of the constituent metals of said catalyst is at least 60%;
the volume of pores with a diameter of more than 0.05 microns is in the range 10% to 40% of the total pore volume.

The process consists of passing a mixture, constituted by the gasoline to be treated and hydrogen, over the catalyst.

The hydrogen is generally introduced in a slight excess, up to 5 moles per mole, with respect to the stoichiometry necessary to hydrogenate the diolefins (one mole of hydrogen per mole of diolefin).

The mixture constituted by gasoline and hydrogen is brought into contact with the catalyst at a pressure in the range 0.5 to 5 MPa, a temperature in the range 80° C. to 220° C., with a liquid hourly space velocity (LHSV) in the range 1 $h^{-1}$ to 10 $h^{-1}$, the liquid hourly space velocity being expressed in liters of feed per liter of catalyst per hour (1/l/h).

DETAILED DESCRIPTION OF THE INVENTION

The invention concerns a process for the treatment of gasolines comprising any type of chemical family, in particular diolefins, mono-olefins and sulphur-containing compounds in the form of mercaptans and light sulphides. The present invention is of particular application in the transformation of conversion gasolines, in particular gasolines from catalytic cracking, fluidized bed catalytic cracking (FCC), a cokefaction process, a visbreaking process, or a pyrolysis process. Feeds to which the invention is applicable have a boiling point in the range 0° C. to 280° C., more precisely between 30° C. and 250° C. The feeds may also comprise hydrocarbons containing 3 or 4 carbon atoms.

As an example, gasolines from catalytic cracking units (FCC) contain, on average, between 0.5% and 5% by weight of diolefins, between 20% and 50% by weight of mono-olefins, and between 10 ppm and 0.5% by weight of sulphur, generally including less than 300 ppm of mercaptans. The mercaptans are generally concentrated in the light gasoline fractions and more precisely in the fraction with a boiling point of less than 120° C.

Treatment of the gasoline described in the present process principally consists of:

selectively hydrogenating the diolefins to mono-olefins;
transforming the light saturated sulphur-containing compounds, principally mercaptans and light sulphides, into heavier sulphides or mercaptans by reaction with the mono-olefins.

The hydrogenation of diolefins to mono-olefins is illustrated below by the transformation of 1,3-pentadiene, which is an unstable compound which easily polymerizes, into pent-2-ene by addition of hydrogen. However, secondary mono-olefin hydrogenation reactions must be limited since, as shown in the example below, they would result in the formation of n-pentane.

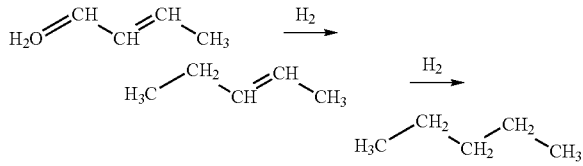

The sulphur-containing compounds which are to be transformed are principally mercaptans. The principal mercaptan transformation reaction consists of thioetherification of mono-olefins by mercaptans. This reaction is illustrated below by the addition of propane-2-thiol to pent-2-ene to form a propylpentylsulphide.

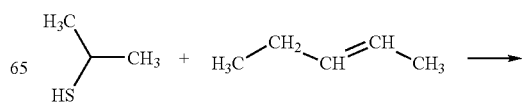

-continued

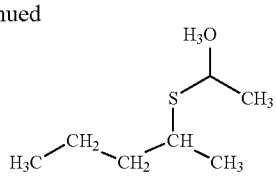

In the presence of hydrogen, sulphur-containing compound transformation may also be carried out by the intermediate formation of $H_2S$ which may then add to unsaturated compounds present in the feed. However, this is a minor pathway under the preferred reaction conditions.

In addition to mercaptans, the compounds which may be transformed into heavier compounds are sulphides and principally dimethylsulphide, methylethylsulphide and diethylsulphide, $CS_2$, COS, thiophane and methylthiophane.

In certain cases, it is also possible to observe reactions for transforming light nitrogen-containing compounds, principally nitrites, pyrrole and its derivatives, into heavier compounds.

The process described in the present invention consists of bringing the feed to be treated, mixed with a stream of hydrogen, into contact with a catalyst containing at least one metal from group VIB (group 6 in the new periodic table notation: Handbook of Chemistry and Physics, $76^{th}$ edition, 1995-1996) and at least one non-noble group VIII metal (groups 8, 9 and 10 of said classification), deposited on a porous support.

In particular, it has been established that catalyst performance is improved when the catalyst has the following characteristics:

The amount, by weight of the oxide, of the group VIB element in the oxide form is strictly more than 12% by weight and preferably strictly pore than 14%. The group VIB metal is preferably selected from molybdenum and tungsten. More preferably, the group VIB metal is molybdenum.

The catalyst also contains a non-noble group VIII metal, preferably selected from nickel, cobalt and iron. More preferably, the non-noble group VIII metal is constituted by nickel. The amount of non-noble group VIII metal, expressed in the oxide form, is less than 15% by weight and is preferably in the range 1% by weight to 10% by weight.

The mole ratio between the non-noble group VIII metal and the group VIB metal is in the range 0.2 to 0.5 mol/mol and is preferably in the range 0.25 to 0.45 mol/mol.

Preferably, a catalyst is used with a total pore volume, measured by mercury porosimetry, of more than 0.4 $cm^3/g$, preferably in the range 0.4 to 0.8 $cm^3/g$ and highly preferably in the range 0.5 to 0.7 $cm^3/g$. Mercury porosimetry is carried out using the ASTM D4284-92 standard with a wetting angle of 140°, using an Autopore III model from Micromeritics.

The specific surface area of the catalyst is preferably less than 250 $m^2/g$, more preferably in the range 30 $m^2/g$ to 150 $m^2/g$.

Further, the pore volume of the catalyst, measured by mercury porosimetry, of pores with a diameter of more than 0.05 microns, is in the range 10% to 40% of the total pore volume and is preferably in the range 15% to 35% of the total pore volume and more preferably in the range 18% to 35% of the total pore volume.

The volume of pores of the catalyst with a diameter of more than 0.1 microns preferably represents at most 20% of the total pore volume and more preferably at most 15% of the total pore volume. The inventors have observed that this pore distribution limits gum formation in the catalyst.

The volume of pores of the catalyst with a diameter between 0.004 and 0.009 microns represents preferably 1 to 5% of the total pore volume and more preferably 2 to 4% of the total pore volume.

Preferably, the catalyst of the invention contains neither alkali metals nor alkaline-earth metals.

Preferably, the catalyst of the invention does not contain any halogen and particularly any fluor.

Preferably, the catalyst of the invention under its oxide form and before catalytic test does not contain any carbon.

The catalyst support is preferably a porous metal oxide selected from alumina, silica, silicon carbide and a mixture of those oxides. More preferably, alumina is used, still more preferably pure alumina.

Highly preferably, cubic gamma alumina or delta alumina is used; more preferably, delta alumina is used.

Preferably, a support having a total pore volume, measured by mercury porosimetry, in the range 0.4 to 0.9 $cm^3/g$ is used, preferably in the range 0.5 to 0.8 $cm^3/g$.

Further, the pore volume of the support, measured by mercury porosimetry, of pores with a diameter of more than 0.1 micron is preferably in the range 0 to 30% of the total pore volume, more preferably in the range 5% to 20% of the total pore volume.

The volume of pores of the support with a diameter of more than 0.05 microns is in the range 10% to 50% of the total pore volume, preferably in the range 15% to 40% of the total pore volume.

The specific surface area of the support is preferably less than 250 $m^2/g$, more preferably in the range 30 $m^2/g$ to 150 $m^2/g$.

A preferred implementation of the invention corresponds to using a catalyst containing an amount of nickel oxide in the form of NiO in the range 1% to 10%, a molybdenum oxide content in the form of $MoO_3$ of more than 12% and a nickel/molybdenum mole ratio in the range 0.25 to 0.45, the metals being deposited on a pure alumina support, the degree of sulphurization of the metals constituting the catalyst being more than 80% and the volume of pores of said catalyst with a diameter of more than 0.05 microns being in the range 18% to 35%.

The catalyst of the invention may be prepared using any technique which is known to the skilled person, in particular by impregnating elements from groups VIII and VIB onto the selected support. Said impregnation may, for example, be carried out using the technique known to the skilled person as dry impregnation, in which exactly the desired quantity of elements is introduced in the form of salts which are soluble in the selected solvent, for example demineralized water, to fill the porosity of the support as exactly as possible. The support, which is by then filled with solution, is preferably dried. The preferred support is alumina, which may be prepared from any type of precursor and shaping tools which are known to the skilled person.

After introducing the group VIII and VIB elements, and optionally shaping the catalyst, it undergoes an activation treatment. This treatment generally aims to transform the molecular precursors of the elements into the oxide phase. In this case, it is an oxidizing treatment, but simple drying of the catalyst may also be carried out. In the case of an oxidizing treatment, also termed calcining, this is generally carried out in air or in diluted oxygen, and the treatment temperature is generally in the range 200° C. to 550° C., preferably in the range 300° C. to 500° C. Examples of salts of group VIB and VIII metals which may be used in the catalyst preparation process are cobalt nitrate, nickel nitrate, ammonium heptamolybdate and ammonium metatungstate. Any other salt which is known to the skilled person which has sufficient solubility and which can decompose during the activation treatment may also be used.

After calcining, the metals deposited on the support are in the oxide form. In the case of nickel and molybdenum, the metals are principally in the $MoO_3$ and NiO forms. Before contact with the feed to be treated, the catalysts undergo a sulphurization step. Sulphurization is preferably carried out in a sulphoreducing medium, i.e. in the presence of $H_2S$ and hydrogen, to transform metal oxides into sulphides such as $MoS_2$ and $Ni_3S_2$, for example. Sulphurization is carried out by injecting a stream containing $H_2S$ and hydrogen, or a sulphur-containing compound which can decompose into $H_2S$ in the presence of catalyst and hydrogen, over the catalyst. Polysulphides such as dimethyldisulphide are $H_2S$ precursors which are routinely used to sulphurize catalysts. The temperature is adjusted so that the $H_2S$ reacts with metal oxides to form metal sulphides. Said sulphurization may be carried out in situ or ex situ (outside or inside the reactor) with respect to the hydrodesulphurization reactor at temperatures in the range 200° C. to 600° C. and more preferably in the range 300° C. to 500° C.

In order to be active, the metals have to be substantially sulphurized. An element is considered to be "substantially" sulphurized when the mole ratio between the sulphur (S) present on the catalyst and said element is at least 60% of the theoretical mole ratio corresponding to total sulphurization of the element under consideration:

$$(S/element)_{catalyst} \geq 0.6 \times (S/element)_{theory}$$

in which:

$(S/element)_{catalyst}$ is the mole ratio between the sulphur (S) and the element present on the catalyst;

$(S/element)_{theory}$ is the mole ratio between the sulphur and the element corresponding to total sulphurization of the element to the sulphide.

This theoretical mole ratio depends on the element under consideration:

$(S/Fe)_{theory} = 1$
$(S/Co)_{theory} = 8/9$
$(S/Ni)_{theory} = 2/3$
$(S/Mo)_{theory} = 2/1$
$(S/W)_{theory} = 2/1$ If the catalyst comprises a plurality of metals, the mole ratio between the S present on the catalyst and the assembled elements must also be at least 60% of the theoretical mole ratio corresponding to total sulphurization of each element to the sulphide, the calculation being carried out pro rata for the relative mole fractions of each element.

As an example, for a catalyst comprising molybdenum and nickel with a respective mole fraction of 0.7 and 0.3, the minimum mole ratio (S/Mo+Ni) is given by the relationship:

$$(S/Mo+Ni)_{catalyst} = 0.6 \times \{(0.7 \times 2) + (0.3 \times (2/3))\}$$

Highly preferably, the degree of sulphurization of the metals is more than 80%.

Sulphurization is carried out on metals in the oxide form without carrying out a prior metal reduction step. Sulphurizing reduced metals is known to be more difficult than sulphurizing metals in the oxide form.

In the selective hydrogenation process of the invention, the feed to be treated is mixed with hydrogen before being brought into contact with the catalyst. The quantity of hydrogen which is injected is such that the mole ratio between the hydrogen and the diolefins to be hydrogenated is more than 1 (stoichiometry) and less than 10, preferably in the range 1 to 5 mol/mol. Too large an excess of hydrogen may cause too much hydrogenation of mono-olefins and as a result, reduce the octane number of the gasoline. The whole feed is generally injected into the reactor inlet. However, it may be advantageous in some cases to inject a fraction or all of the feed between two consecutive catalytic beds placed in the reactor. This implementation can allow the reactor to continue operating if the inlet to the reactor is blocked with deposits of polymers, particles or gums present in the feed.

The mixture constituted by gasoline and hydrogen is brought into contact with the catalyst at a temperature in the range 80° C. to 220° C., preferably in the range 90° C. to 200° C., with a liquid hourly space velocity (LHSV) in the range 1 $h^{-1}$ to 10 $h^{-1}$. The pressure is adjusted so that the reaction mixture is mainly in the liquid form in the reactor. The pressure is in the range 0.5 MPa to 5 MPa and is preferably in the range 1 to 4 MPa.

The gasoline treated under the conditions mentioned above has a reduced diolefins and mercaptans content. Generally, the gasoline produced contains less than 1% by weight of diolefins and preferably less than 0.5% by weight of diolefins. The amount of light sulphur-containing compounds with a boiling point less than that of thiophene (84° C.) which is generally converted is more than 50%. Thus, it is possible to separate the light fraction of the gasoline by distillation and to send said fraction directly to the gasoline pool without complementary treatment. The light fraction of the gasoline generally has an end point of less than 120° C., preferably less than 100° C. and more preferably less than 80° C.

This novel catalyst is particularly suitable for use in the process described in European patent EP-A-1 077 247.

EXAMPLE 1

Preparation of Catalysts A, B, C and D (Not in Accordance), E and F (in Accordance with the Invention)

Catalysts A, B, C, D, E and F were prepared using the dry impregnation method. The synthesis protocol consisted of carrying out dry impregnation of a solution of ammonium heptamolybdate and nickel nitrate, the volume of the aqueous solution containing the metal precursors being equal to the water take-up volume corresponding to the mass of the support to be impregnated (total volume of water which can penetrate into the porosity). The concentrations of the precursors in the solution were adjusted to deposit the desired amounts by weight of metal oxides on the support. The solid was then left to mature at ambient temperature for 12 hours, and dried at 120° C. for 12 hours. Finally, the solid was calcined at 500° C. for two hours in air (1 l/g.h). The alumina support used was an industrial support supplied by Axens. The characteristics of the prepared catalysts are shown in Table 1 below. The prepared catalysts were distinguished by their active phase content.

TABLE 1

Characteristics of catalysts A, B, C, D, E, F, in the oxide form

| Catalyst | A | B | C | D | E | F |
|---|---|---|---|---|---|---|
| Wt % of $MoO_3$ | 5.2 | 8.1 | 10.0 | 11.2 | 12.1 | 14.1 |
| Wt % of NiO | 1.1 | 1.6 | 2.2 | 2.3 | 2.5 | 2.7 |
| Ni/Mo mole ratio | 0.4 | 0.38 | 0.43 | 0.40 | 0.40 | 0.37 |

TABLE 1-continued

Characteristics of catalysts A, B, C, D, E, F, in the oxide form

| Catalyst | A | B | C | D | E | F |
|---|---|---|---|---|---|---|
| S(BET), m$^2$/g | 120 | 115 | 112 | 108 | 106 | 102 |
| Total pore vol, cm$^3$/g | 0.68 | 0.65 | 0.62 | 0.60 | 0.58 | 0.55 |
| Hg pore vol, cm$^3$/g (pores > 0.05 microns) and as % of total pore vol | 0.19 28% | 0.18 28% | 0.18 29% | 0.17 28% | 0.16 28% | 0.15 27% |
| Hg pore vol, cm3/g (0.004 micron < pores < 0.009 micron) and as % of total pore vol | 0.02 3% | 0.2 3% | 0.02 3% | 0.01 1.6% | 0.01 1.7% | 0.01 1.8% |

According to the porosity, specific surface area, amount of MoO$_3$ and the Ni/Mo mole ratio criteria, catalysts E and F were thus in accordance with the invention; in contrast, catalysts A, B, C and D (lowest molybdenum contents) were not in accordance with the invention.

Evaluation of Catalysts

The activity of catalysts A, B, C, D, E and F was evaluated using a test for selective hydrogenation of a mixture of model molecules carried out in a stirred 500 ml autoclave reactor.

Typically, between 2 and 6 g of catalyst was sulphurized at atmospheric pressure in a sulphurization unit in a mixture of H$_2$S/H$_2$ constituted by 15% by volume of H$_2$S at 1 l/g.h of catalyst and at 400° C. for two hours (5° C./min ramp-up) followed by a constant temperature stage of 2 hours in pure hydrogen at 200° C. This protocol produced degrees of sulphurization of more than 80% for all of the catalysts of the invention. The sulphurized catalyst was transferred into the reactor, sealed from the air, then brought into contact with 250 ml of model feed at a total pressure of 1.5 MPa and a temperature of 160° C. The pressure was kept constant during the test by adding hydrogen. The feed used for the activity test had the following composition: 1000 ppm by weight of sulphur in the form of 3-methyl thiophene, 100 ppm by weight of sulphur in the form of propane-2-thiol, 10% by weight of olefin in the form of 1-hexene, in n-heptane.

The time t=0 of the test corresponded to bringing the catalyst and the feed into contact. The test duration was fixed at 45 minutes and gas chromatographic analysis of the liquid effluent obtained allowed an evaluation of the activities of the various catalysts for the hydrogenation of isoprene (formation of methylbutenes), the hydrogenation of 1-hexene (formation of n-hexane) and transformation of propane-2-thiol into heavier compounds (disappearance of propane-2-thiol) to be carried out. The activity of the catalyst for each reaction was defined with respect to the rate constant obtained for each reaction, normalized to one gram of catalyst. The rate constant was calculated by considering the reaction to be first order:

$$A(X)=k(X)/m$$

in which: $A(X)$=activity of catalyst for reaction X, in min$^{-1}$/g of catalyst;
    m=mass of catalyst (oxide form) used in test;
    k=rate constant for the reaction under consideration, in min$^{-1}$,
calculated using the formula:

$$k(X)=(1/45)*\ln(100/(100-\text{conv}(X)))$$

in which 45 = duration of test in minutes;
    Conv(X) conversion of compound X; X=isoprene or propane-2-thiol or 1-hexene;
    X: reaction under consideration
    X=isoprene: hydrogenation of isoprene
    X=1-hexene: hydrogenation of 1-hexene
    X=propane-2-thiol: conversion of propane-2-thiol.

The selectivity of the catalyst towards isoprene hydrogenation is equal to the ratio of the activities of the catalyst in the hydrogenation of isoprene and 1-hexene: A(isoprene)/A(1-hexene).

The results obtained for the various catalysts are shown in Table 2 below.

TABLE 2

Performances of catalysts in model molecule test

| Catalyst | A | B | C | D | E | F |
|---|---|---|---|---|---|---|
| A(isoprene) * 10$^3$ | 2.4 | 3.4 | 3.6 | 4.5 | 4.7 | 4.9 |
| A(1-hexene) * 10$^3$ | 0.014 | 0.018 | 0.022 | 0.024 | 0.027 | 0.029 |
| A(isoprene)/A(1-hexene) | 171 | 189 | 163 | 187 | 174 | 169 |
| A(propane-2-thiol) * 10$^3$ | 11.7 | Infinite* | Infinite* | Infinite* | Infinite* | Infinite* |

*complete conversion of propane-2-thiol.

It can be seen that all of the catalysts were highly selective as regards the diolefin hydrogenation reaction. These catalysts could thus substantially hydrogenate isoprene without significantly hydrogenating 1-hexene.

It can also be seen that under the test conditions, conversion of light mercaptans was complete for all of the catalysts apart from catalyst A, which had less of the active phase.

In the case of catalysts B, C, D, E and F, an infinite activity meant complete conversion of propane-2-thiol.

In contrast, only catalysts E and F of the invention had a maximum isoprene hydrogenation activity.

It thus appears that the catalysts of the invention are capable of simultaneously carrying out selective hydrogenation of the diolefin with simultaneous conversion of the light mercaptan.

EXAMPLE 2

Influence of Degree of Sulphurization

Catalyst E described above was evaluated in the model molecule test described in Example 1 (identical feed and operating conditions) but without the prior sulphurization step. The degree of sulphurization of the solid was thus zero. The reduction in the temperature of the constant temperature stage with the $H_2S/H_2$ mixture (from 400° C. to typically 100° to 150° C.) during the catalyst sulphurization protocol on the sulphurization bench could also produce intermediate degrees of sulphurization for catalyst E. Table 3 records the catalytic results obtained on said catalyst as a function of its degree of sulphurization. It can be seen that prior sulphurization of the catalyst had a major beneficial effect on the activity of the catalyst in the hydrogenation of isoprene and in the conversion of propane-2-thiol, as well as on its selectivity.

TABLE 3

Performance of catalyst E as a function of its degree of sulphurization

|  | E, non sulphurized | E, sulphurized | | |
| --- | --- | --- | --- | --- |
| Degree of sulphurization, % | 0 | 45 | 65 | 86 |
| A(isoprene) * $10^3$ | 0.3 | 2.4 | 3.3 | 4.7 |
| A(1-hexene) * $10^3$ | 0.010 | 0.014 | 0.019 | 0.027 |
| A(isoprene)/A(1-hexene) | 18 | 71 | 173 | 174 |
| A(propane-2-thiol) * $10^3$ | 3 | Infinite* | Infinite* | Infinite* |

*total conversion of propane-2-thiol

EXAMPLE 3

Influence of Ni/Mo Mole Ratio

In this example, catalysts G and H were prepared using the operating protocol described in Example 1. These catalysts only differed substantially from catalyst E in their nickel contents, and thus in the Ni/Mo mole ratio (Table 4). Thus, they were not in accordance with the invention.

TABLE 4

Characteristics of catalysts G and H in the oxide form

| Catalyst | G | H |
| --- | --- | --- |
| Wt % of $MoO_3$ | 12.1 | 12.4 |
| Wt % of NiO | 0.8 | 8.6 |
| Ni/Mo mole ratio | 0.13 | 1.34 |
| S(BET), $m^2/g$ | 106 | 100 |
| Total pore vol, $cm^3/g$ | 0.58 | 0.55 |
| Hg pore vol, $cm^3/g$ (pores > 0.05 microns) and as % of total pore volume | 0.17 29% | 0.16 29% |

Catalysts G and H were evaluated in the model molecule test described in Example 1. For these catalysts, the sulphurization protocol which was adopted could produce degrees of sulphurization of more than 80%. These catalysts were compared with catalyst E, which had a Ni/Mo mole ratio of 0.4, falling within the preferred range, and a similar degree of sulphurization (Table 5).

TABLE 5

Performance of catalysts E, G and H in a model molecule test

| Catalyst | E | G | H |
| --- | --- | --- | --- |
| Degree of sulphurization | 86% | 85% | 89% |
| A(isoprene) * $10^3$ | 4.7 | 1.3 | 5.0 |
| A(1-hexene) * $10^3$ | 0.027 | 0.010 | 0.030 |
| A(isoprene)/A(1-hexene) | 174 | 130 | 167 |
| A(propane-2-thiol) * $10^3$ | Infinite* | 10.2 | Infinite* |

*total conversion of propane-2-thiol

It will be observed that catalyst G (Ni/Mo ratio of 0.13) had a lower isoprene hydrogenation activity and propane-2-thiol conversion than catalyst E of the invention. It will also be observed that the large increase in the nickel content (catalyst H, Ni/Mo ratio of 1.34) did not improve the performance of the catalyst in terms of activity and selectivity.

EXAMPLE 4

Influence of Macropore Volume in the Range 10% to 40% of Total Pore Volume

Catalysts I, J and K were prepared using the protocol described in Example 1 using different alumina supports Al-1, Al-2 and Al-3 supplied by Axens the properties of which are shown in Table 6 below.

TABLE 6

Properties of supports Al-1, Al-2, Al-3

|  | Al-1 | Al-2 | Al-3 |
| --- | --- | --- | --- |
| SBET ($m^2/g$) | 145 | 137 | 293 |
| Total pore volume (Hg) $cm^3/g$ | 0.73 | 1.10 | 0.75 |
| Pore volume (Hg) pores > 0.1 micron, $cm^3/g$ | 0.09 | 0.32 | 0.01 |
| V (0.1 microns), % of total pore volume | 12% | 29% | 1% |
| Pore volume (Hg) pores > 0.05 microns, $cm^3/g$ | 0.22 | 0.49 | 0.03 |
| V (0.05 microns), % of total pore volume | 30% | 45% | 4% |

The characteristics of these catalysts and that of catalyst E are shown in Table 7 below. Catalysts E and I were in accordance with the invention. Catalyst J was not in accordance with the invention as the pore volume fraction of pores with a diameter of more than 0.05 microns was greater than 40% (45%). Catalyst K was also not in accordance with the invention as the pore volume fraction of pores with a diameter of more than 0.05 microns was less than 10% (3%).

TABLE 7 characteristics of catalysts E, I, J and K

| Catalyst | E | I | J | K |
|---|---|---|---|---|
| Wt % of $MoO_3$ | 12.1 | 12.0 | 12.3 | 12.1 |
| Wt % of NiO | 2.5 | 2.4 | 2.5 | 2.2 |
| S(BET), $m^2/g$ | 106 | 120 | 116 | 278 |
| Total pore volume, $cm^3/g$ | 0.58 | 0.62 | 1.00 | 0.65 |
| Pore volume (Hg), $cm^3/g$ (pores > 0.05 micron) | 0.16 | 0.21 | 0.45 | 0.02 |
| Pore volume (Hg), $cm^3/g$ pores > 0.1 micron) | 0.08 | 0.09 | 0.31 | 0.01 |
| Pore volume (pores > 0.05 micron), as % of total pore volume | 28% | 34% | 45% | 3% |
| Pore volume pores > 0.1 micron), as % of total pore volume | 14% | 15% | 31% | 2% |
| SPD $(g/cm^3)$* | 0.69 | 0.65 | 0.48 | 0.59 |

*Settled packing density

The settled packing density (SPD) corresponds to the maximum quantity of catalyst in a given volume and is normalized to one gram of catalyst per cubic centimeter. This was evaluated using a RETSCH AS 200 control vibrator and a measuring cylinder of known volume and diameter adapted to the granulometry of the products (the diameter of the measuring cylinder must be 10 times that of the particles). After calibration, the measuring cylinder, with volume V, was filled with the test product on the vibrator. Vibration was maintained for 3 minutes at an amplitude of 0.03 inches, keeping the level constant by adding product. At the end of settling, the surface of the product was skimmed level with the upper part of the sample and the mass of the full measuring cylinder was weighed. The SPD was then obtained by dividing the mass, corrected for the loss on ignition of the catalyst, by the volume of the measuring cylinder. In general, the lower the porosity of the catalyst, the greater will be the charging density.

These catalysts were tested on a total catalytic cracking gasoline the characteristics of which are provided in Table 8 below. The conjugated diolefins content was determined based on the reaction of conjugated dienes with maleic anhydride in accordance with the Diels-Alder reaction. The MAV (maleic anhydride value) was proportional to the amount of diolefin present and was determined using the standard IFP method: method 9407. The MAV was expressed in milligrams of maleic anhydride reacted per gram of sample. The IFP9407 method is similar to the standardized 326-82UOP method which provides the DV (diene value), the two values being linked by the relationship MAV=3.86 DV. The amount of aromatics and mono-olefins in the feed and the effluent were quantified by chromatography. The light mercaptans of the feed and effluent were quantified by chromatography. The equipment used was a HP5890 Series II (Agilent Technologies) chromatograph coupled to a specific detector, a 355 (Sievers Inc., Boulder, Colo., USA). The column used was a non-polar PONA (50 m, 0.2 mm, 0.20 microns) column. The operating conditions were derived from the ASTM D 5623 standard method and the sulphur-containing compounds were identified by comparison with the retention times for reference sulphur-containing compounds.

TABLE 8

Characteristics of total catalytically cracked gasoline

| | |
|---|---|
| S content | 3460 ppm |
| Light mercaptans*, S content | 116 ppm |
| MAV | 17.5 |
| Aromatics content | 36.5% by weight |
| Mono-olefins content | 34.4% by weight |
| ASTM distillation | 5% point: 30° C. |
| | 95% point: 233° C. |

*methanethiol, ethanethiol and propanethiols

The following protocol was used to evaluate the catalysts on a real feed. 50 $cm^3$ of catalyst was sulphurized in a mixture of n-heptane +4% DMDS (dimethyldisulphide)/$H_2$, the $H_2$/sulphurization feed volume ratio being 500 normal liters/liter of feed (Nl/l) and the HSV of the sulphurization feed being 2 $h^{-1}$ (volume of sulphurization feed per volume of catalyst per hour). The temperature ramp-up was 1° C./min to a constant temperature stage of 350° C. The constant temperature stage lasted 4 hours. The temperature was then dropped to 120° C., the sulphurization feed was replaced with pure n-heptane for 4 hours, then the FCC gasoline was injected and the operating conditions were adjusted to the desired values. The test operating conditions were as follows: total pressure=2.5 MPa, $H_2$/feed ratio=6 Nl/l, HSV=3 $h^{-1}$. The catalysts were evaluated at 140° C. and at 160° C., the duration of each constant temperature stage being adjusted as a function of the stabilization period of the catalyst, evaluated by regular analyses of the MAV of the effluent.

BRIEF DESCRIPTION OF DRAWINGS

The change in the residual MAV of the effluent as a function of time for the 4 catalysts is shown in FIG. 1.

Figure 1:
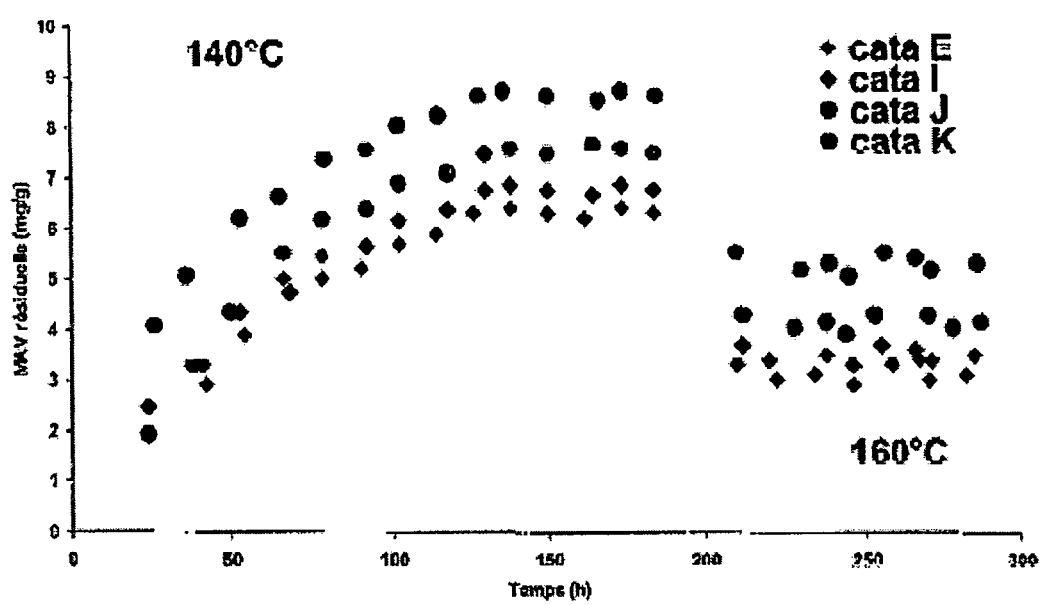
FIG. 1 shows that the catalysts E and I, in accordance with the invention, eliminate diolefins most effectively at 140° C. and 160° C. since the residual MAV obtained is the lowest. Catalyst J, characterized by too high a pore volume, had a substantial hydrogenating activity deficit. The activity of catalyst K over the first 50 hours was comparable with catalyst E and I, but it was less resistant to crushing and thus it deactivated more. Residual carbon analyses carried out on the used catalysts after extracting with toluene showed that the carbon content of catalyst K was about twice as high as the carbon content of catalyst E and I.

For the set of catalysts, under the selected operating conditions, mono-olefin hydrogenation remained marginal and below 2%.

TABLE 9

Conversion of light mercaptans at 140° C. and 160° C. obtained with catalysts E, I, J, K

| | Conversion at 140° C. | Conversion at 160° C. |
|---|---|---|
| Catalyst E | 94% | 100% |
| Catalyst I | 93% | 100% |
| Catalyst J | 89% | 95% |
| Catalyst K | 90% | 96% |

Table 9 shows the change in the conversion of light mercaptans for the 4 catalysts at each temperature after catalyst stabilization (last part of each stage). It can be seen that under the selected operating conditions, all of the catalysts converted the light mercaptans of the feed to a large extent, said conversion being complete for catalysts E and I at 160° C. In contrast, it can be seen that catalysts E and I, which were in accordance with the invention, were more effective than catalysts J and K in eliminating light mercaptans.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/13.172, filed Dec. 22, 2005, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising selectively hydrogenating a gasoline containing polyunsaturated compounds and saturated light sulphur-containing compounds, whereby the polyunsaturated compounds are hydrogenated into monounsaturated compounds and whereby, jointly, the saturated light sulphur-containing compounds are transformed into heavier compounds by reaction with the unsaturated compounds contained in the gasoline, wherein the reactions are conducted in contact with a catalyst comprising one or more metals from group VIB including at least molybdenum, and at least one non-noble metal from group VIII including at least nickel, deposited on a porous catalyst support, in which:
- the amount, by weight of oxide, of the group VIB metal(s) is greater than 12% by weight;
- the amount, by weight of oxide, of the group VIII metal(s) is less than 15% by weight;
- the metals in said catalyst have a degree of sulphurization of at least 60%;
- the volume of pores with a diameter of more than 0.05 microns is in the range 10% to 40% of the total pore volume of the catalyst; and
- the mole ratio between the nickel and molybdenum, Ni/Mo, is in the range of 0.2 to 0.5 mol/mol.

2. A process according to claim 1, in which the catalyst comprises an amount of the oxide of the group VIII element in the range of 1% to 10% by weight.

3. A process according to claim 1, in which the degree of sulphurization of the metals in said catalyst is more than 80%.

4. A process according to claim 1, in which the Ni/Mo mole ratio is in the range of 0.25 to 0.45.

5. A process according to claim 1, in which the catalyst has a total pore volume of more than 0.4 $cm^3/g$.

6. A process according to claim 1, in which the catalyst has a total pore volume in the range of 0.4 $cm^3/g$ to 0.8 $cm^3/g$.

7. A process according to claim 6, in which the catalyst support has a total pore volume in the range of 0.5 $cm^3/g$ to 0.7 $cm^3/g$.

8. A process according to claim 1, in which the volume of pores of the catalyst with a diameter of more than 0.1 microns represents at most 20% of the total pore volume.

9. A process according to claim 8, in which the volume of pores of the catalyst with a diameter of more than 0.1 micron represents at most 15% of the total pore volume.

10. A process according to claim 1, in which the volume of pores of the catalyst with a diameter of more than 0.05 micron represents 15% to 35% of the total pore volume.

11. A process according to claim 10, in which the volume of pores of the catalyst with a diameter of more than 0.05 micron represents 18% to 35% of the total pore volume.

12. A process according to claim 1, in which the specific surface area of the catalyst is less than 250 $m^2/g$.

13. A process according to claim 1, in which the catalyst support is a porous metal oxide selected from alumina, silica, silicon carbide and a mixture of said oxides.

14. A process according to claim 13, in which the catalyst support is constituted by pure alumina.

15. A process according to claim 13, in which the catalyst support comprises cubic gamma alumina or delta alumina.

16. A process according to claim 15, in which the catalyst support comprises delta alumina.

17. A process according to claim 13, in which the catalyst support has a pore volume in the range of 0.4 to 0.9 $cm^3/g$.

18. A process according to claim 17, in which the catalyst support has a pore volume in the range of 0.5 to 0.8 $cm^3/g$.

19. A process according to claim 13, in which the volume of pores of the support with a diameter of more than 0.1 micron represents 0 to 30% of the total pore volume.

20. A process according to claim 19, in which the volume of pores of the support with a diameter of more than 0.1 micron represents 5% to 20% of the total pore volume.

21. A process according to claim 13, in which the volume of pores of the support with a diameter of more than 0.05 microns represents 10% to 50% of the total pore volume.

22. A process according to claim 21, in which the volume of pores of the support with a diameter of more than 0.05 microns represents 15% to 40% of the total pore volume.

23. A process according to claim 1, in which the gasoline is brought into contact with the catalyst at a temperature in the range of 80° C. to 220° C. with a liquid hourly space velocity in the range of 1 $h^{-1}$ to 10 $h^{-1}$ and at a pressure in the range of 0.5 to 5 MPa.

24. A process according to claim 1, wherein the specific area of catalyst support is 30-150 $m^2/g$.

* * * * *